No. 12,508. REISSUED JULY 17, 1906.

B. T. BRUCE.

TYPE WRITER CARRIAGE.

APPLICATION FILED APR. 28, 1906.

2 SHEETS—SHEET 1.

Witnesses
Kittie Frankfort
P. J. Culkin

Inventor
Brainard T. Bruce
By his Attorney
B. B. Stickney

No. 12,508. REISSUED JULY 17, 1906.

B. T. BRUCE.

TYPE WRITER CARRIAGE.

APPLICATION FILED APR. 28, 1906.

2 SHEETS—SHEET 2.

Witnesses
Kittie Frankfort
P. J. Culkin

Inventor
Brainard T. Bruce
By his Attorney B. C. Stickney

UNITED STATES PATENT OFFICE.

BRAINARD TAYLOR BRUCE, OF JERSEY CITY, NEW JERSEY, ASSIGNOR TO UNDERWOOD TYPEWRITER COMPANY, OF NEW YORK, N. Y., A CORPORATION OF NEW JERSEY.

TYPE-WRITER CARRIAGE.

No. 12,508. Specification of Reissued Letters Patent. Reissued July 17, 1906.

Original No. 779,408, dated January 10, 1905. Application for reissue filed April 28, 1906. Serial No. 314,313.

*To all whom it may concern:*

Be it known that I, BRAINARD TAYLOR BRUCE, a citizen of the United States, and a resident of Jersey City, New Jersey, have invented certain new and useful Improvements in Type-Writer Carriages, of which the following is a specification.

My invention relates to carriages for typewriters and like machines, and has for its object to provide improved means for holding and feeding a plurality of writing-surfaces for the purpose, as an instance, of enabling a series of originals to be produced successively on separate sheets of paper while duplicates thereof are made at the same time on a continuous sheet or strip.

The invention will be fully described hereinafter and the features of novelty pointed out in the appended claims.

Reference is to be had to the accompanying drawings, in which—

Figure 1:
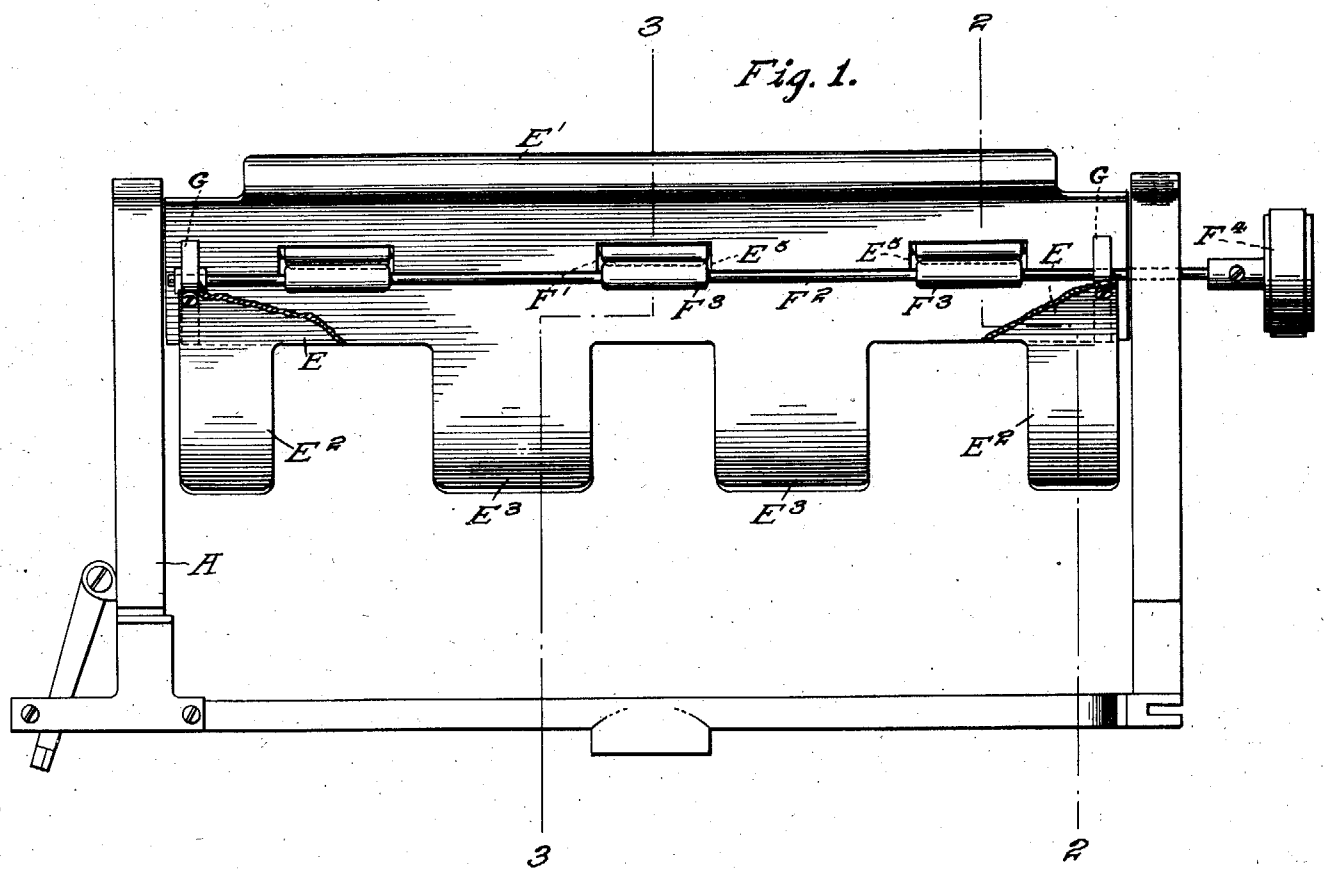
Figure 2:
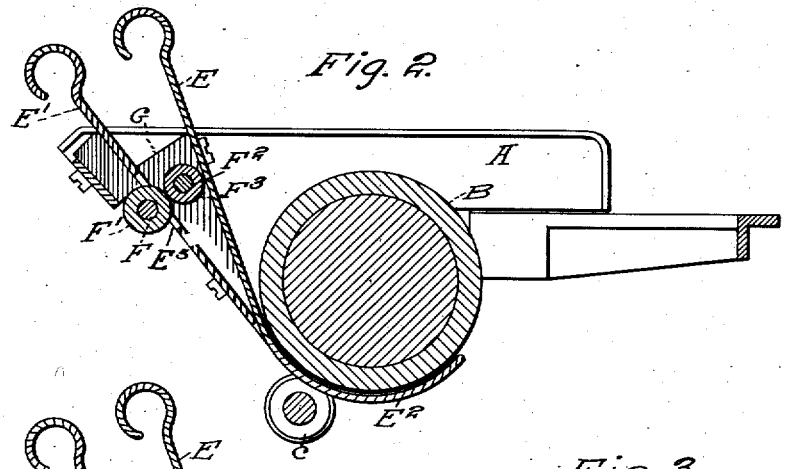
Figure 3:
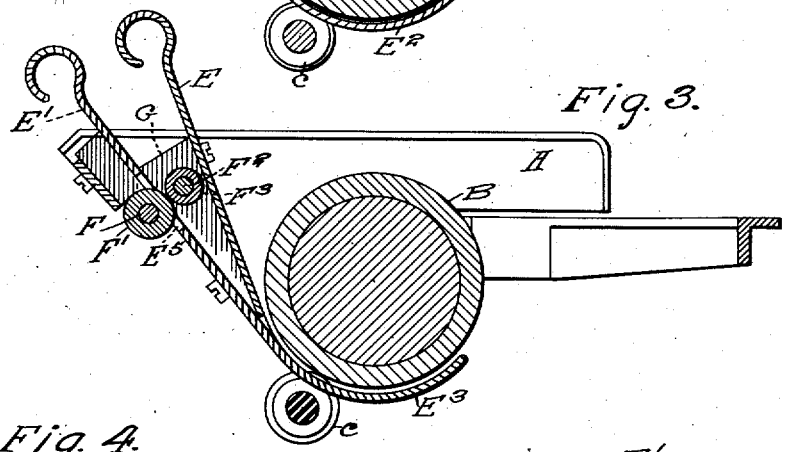
Figure 4:
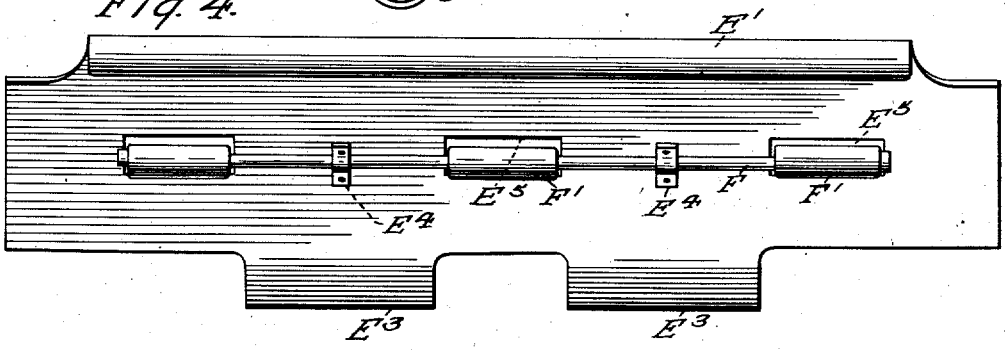

Figure 1 is a top view, with parts broken away, of so much of a type-writer carriage as is required to illustrate my invention. Figs. 2 and 3 are sectional elevations of lines 2 2 and 3 3, respectively, of Fig. 1; and Fig. 4 is a rear view of the rear paper-shelf.

A designates the frame carrying the platen B. These parts may be constructed in any approved manner, as may also the feed-rollers C, which coöperate with the platen B to bring the paper forward.

In the rear of the platen (in case of a front-strike machine) are located two paper-shelves E E′, converging toward the platen and terminating about tangentially thereto. One of these shelves, or both, may be provided with guide-fingers conforming to the curvature of the platen and lying close thereto. In the construction illustrated the fingers $E^2$ of the front shelf E are located at the ends and the fingers $E^3$ of the rear shelf at the center, with sufficient space between adjacent fingers to accommodate the feed-rollers C. Other means, however, may be provided for properly guiding the paper around the platen B.

For feeding the paper or writing-surface which passes between the shelves E E′, I provide a separate device independent of the rollers C. This auxiliary device, as shown, may consist of a series of rubber rollers F′, secured to or journaled upon an axle or shaft F, which is carried by brackets E on the rear of shelf E′. These rollers F′ are located mainly in the rear of said shelf, but project through openings $E^5$ therein, so that the said rollers are about flush with the supporting-surface of the shelf E′ or slightly in advance thereof. Between the two shelves and immediately adjacent to the rollers F′ is located another set of rollers $F^3$, secured upon a shaft $F^2$, which is journaled in stationary plates or brackets G. The front shelf E may also be secured to these brackets, preferably in such a manner as to be removable readily. A handle or knob $F^4$ is provided at the end of the shaft $F^2$ to enable it to be turned.

In the use of my invention a long strip of paper with a strip of copying-paper under it is fed between the platen B and the front shelf E. A sheet of letter-paper or the like is then inserted between the rollers F′ and $F^3$, and by turning the handle $F^4$ the sheet of paper is fed downward until it is within the reach of the platen B and the ordinary feed-rollers C. By then turning the platen both the sheet of paper and the strip will be fed simultaneously to the printing position. After the sheet of paper has been written upon and removed from the machine the next sheet is inserted and fed to the proper position by the rollers F′ and $F^3$, while the strip remains stationary until the platen is turned to feed both the sheet and the strip. Thus there will be preserved on the strip a continuous record or copy of all matters written upon the separate sheets of paper. If desired, the front shelf E may be removed and then the machine can be used in the customary manner with or without the auxiliary feed-rollers F′ $F^3$. The provision of the feed-roller C is not absolutely essential. I have illustrated them because this is the usual construction.

Various modifications may be made without departing from the nature of my invention.

I claim as my invention and desire to secure by Letters Patent—

1. In a type-writer or like machine, a platen and a plurality of paper-shelves located adjacent thereto and provided with fingers conforming to the curvature of the platen, the fingers of all of the shelves lying in the same cylindrical surface.

2. In a type-writer or like machine, a platen and a plurality of paper-shelves located adjacent thereto and each provided with fingers extended partly around the platen at different points thereof, the fingers of all of the shelves lying in the same cylindrical surface.

3. In a type-writer or like machine, a platen, a plurality of downwardly and forwardly inclined paper-shelves leading independently to the lower rear side thereof, and a manually-operable device located between said shelves for feeding sheets toward the platen while the latter is stationary.

4. In a type-writer or like machine, a platen, a plurality of downwardly and forwardly inclined paper-shelves leading independently to the lower rear side thereof, and a manually-operable device independent of the platen for feeding the paper between said shelves toward the platen while the latter is stationary.

5. In a type-writer or like machine, a platen, a plurality of downwardly and forwardly inclined paper-shelves leading to the lower rear side thereof, a set of manually-operable feed-rollers projecting through one of said shelves, and another set of feed-rollers arranged between the shelves and coöperating with the first-named set of rollers to feed paper around the platen while the latter is stationary.

6. In a type-writer, the combination of a platen, a series of paper-shelves one behind another in rear of the platen, each extending upwardly and rearwardly from the lower rear side of the platen, and means for guiding around the platen, while the latter is stationary, an outer sheet independently of a sheet confined between the outer sheet and the platen.

7. In a type-writer, the combination with a platen, of a series of paper-shelves, one behind another in rear of the platen, each extending upwardly from the lower rear side of the platen, a rearmost shelf being continued forwardly around the under side of the platen to the front portion thereof.

8. In a type-writer, the combination with a platen, of a series of paper-shelves, one behind another in rear of the platen, each extending upwardly from the lower rear side of the platen, each shelf being continued forwardly around the under side of the platen to the front portion thereof.

9. In a type-writer, the combination with a platen, of two paper-shelves, one behind the other and both in rear of the platen, and extending upwardly from the rear side thereof, and paper-guiding means curving from the rear paper-shelf forwardly beneath the platen to the front side thereof; said forward paper-shelf having means to coöperate with the platen to protect the inner sheet against disarrangement by the movement of an outer sheet around the same.

10. In a type-writer, the combination with a platen, of a pair of devices at the ends of the platen for engaging only the side margins of wide sheets to hold them upon the platen, and intermediate means for independently guiding around the platen an outer sheet which is too narrow to be held by said pair of devices, while said wide sheets are stationary upon the platen.

11. In a type-writer, the combination with a platen, of two paper-shelves one behind the other in rear of the platen, said paper-shelves converging toward the platen, and terminating about tangentially thereto, and provided with forward-extending paper-guiding devices conforming to the curvature of the platen.

12. In a type-writer, the combination with a platen, of two paper-shelves, one behind the other in rear of the platen, and converging downwardly toward the rear lower side thereof, the front shelf having at its ends fingers which curve forwardly around the under side of the platen to the front thereof, and the rear shelf having guiding means curving forwardly around the under side of the platen between said fingers.

13. In a type-writer, the combination of a platen, a series of paper-shelves one behind another in rear of the platen, each extending upwardly and rearwardly from the lower rear side of the platen; said front shelf being removably mounted; and means for guiding around both the platen and a sheet thereon, while platen and sheet are stationary, an outer sheet independently of the inner sheet.

BRAINARD TAYLOR BRUCE.

Witnesses:

STEPHEN T. SMITH,

D. W. BUGEN.